Patented June 16, 1942

2,286,738

UNITED STATES PATENT OFFICE 2,286,738

PREPARATION OF DITHIOCARBAMATES

Julian Werner Hill, Wilmington, Del., assignor to E. I. du Pont de Nemours & Company, Wilmington, Del., a corporation of Delaware No Drawing. Application August 16, 1940, Serial No. 352,983

15 Claims. (Cl. 260—500)

This invention relates to the preparation of dithiocarbamates and thiuram disulfides from alkylamides.

Thiuram disulfides are commercially valuable compounds. Thus, tetramethylthiuram disulfide is widely used as an insecticide and rubber accelerator. Salts of dimethyl-dithiocarbamic acids are also useful as rubber accelerators and intermediates.

This invention has as an object the provision of a new, convenient and economical process for the preparation of dithiocarbamates and thiuram disulfides. A further special object is the provision of a new process for the manufacture of tetramethylthiuram disulfide and salts of dimethyl-dithiocarbamic acids. Other objects will appear hereinafter.

These objects are accomplished by the following invention wherein a substituted thiuram disulfide is prepared by a process comprising the alkaline hydrolysis of a tertiary amide of an aliphatic carboxylic acid of from one to three carbon atoms and free from substituents other than hydroxy and alkoxy, the substituents on the amide nitrogen being saturated aliphatic hydrocarbon radicals of from one to three carbon atoms, in the presence of at least one equivalent, based on the amide, of carbon disulfide and in the presence of a solvent for the amide and the alkali and the oxidation of the resulting substituted dithiocarbamate.

The preferred embodiment of the invention is carried out as follows: To a stirred 10 to 20% solution of 2 moles of caustic alkali in a reactor fitted with a sealed mechanical stirrer, reflux condenser, thermometer, and addition device is added a mixture of 1 mole of a tertiary amide with at least 1 mole of carbon disulfide. An exothermic reaction sets in at once. On a large scale it is best to add these ingredients slowly and with efficient cooling. When the reaction is complete and the reaction mixture is homogeneous, an oxidizing agent such as an aqueous iodine-potassium iodide solution, chlorine-oxygen mixture, hydrogen peroxide or the like is added with stirring until precipitation of the resulting thiuram disulfide is complete. The product is isolated by filtration and purified by crystallization from an appropriate solvent.

The process is of particular utility in the reaction of caustic alkali, carbon disulfide and a tertiary formamide. These substituted formamides may be economically and conveniently prepared in one step from alcohols, carbon monoxide, and ammonia according to U. S. Patent 2,204,371.

The more detailed practice of the invention is illustrated by the following examples, wherein parts given are by weight. There are of course many forms of the invention other than these specific embodiments.

Example I

A mixture of 44 parts of dimethylformamide with 46 parts of carbon disulfide is added rapidly to a stirred solution of 48 parts of sodium hydroxide in 200 parts of water in a reactor fitted with a sealed mechanical stirrer, reflux condenser, thermometer, and addition device. An exothermic reaction sets in at once so that the mixture refluxes. The reddish brown reaction mixture gradually becomes clearer and is homogeneous at completion of the exothermic reaction, which requires about 20 minutes. The reaction mixture is diluted with 2500 parts of water and a solution of iodine in saturated aqueous potassium iodide is added till persistence of the iodine color shows the oxidation reaction to be complete. The insoluble crystalline product is collected on a filter, washed with water, and dried in an oven at 100° C. The yield of crude tetramethylthiuram disulfide is 70 parts (97% of the theoretical).

Example II

A mixture of 7.3 parts of dimethylformamide with 7.6 parts of carbon disulfide is added to a hot solution of 8 parts of sodium hydroxide in 80 parts of 95% ethanol. The solution at once turns yellow and within 1 minute a crystalline precipitate forms. The mixture is heated under reflux for 7 hrs. and then poured into 300 parts of water. To the resulting solution is added a solution of 14 parts of iodine in saturated aqueous potassium iodide solution. The yield of tetramethylthiuram disulfide isolated as described in Example I is 9 parts (75% of the theoretical).

Example III

To a solution of 46 parts of sodium in 800 parts of anhydrous ethanol is added 18 parts of water, 76 parts of carbon disulfide, and 73 parts of dimethylformamide. The mixture is heated under reflux for 20 hrs., cooled, and filtered to remove sodium formate (66.5 parts). The filtrate is concentrated and diluted with ether and the resulting precipitate of colorless, crystalline sodium dimethyldithiocarbamate is collected on a filter. The yield is 113 g. (80% of the theoretical). This product is oxidized with iodine in aqueous potassium iodide solution to obtain tetramethylthiuram disulfide.

Example IV

According to the procedure of Example I, a mixture of 51 parts of N,N-dimethylmethoxyacetamide with 38 parts of carbon disulfide is added to a solution of 47 parts of sodium hydroxide in 200 parts of water. An exothermic reaction takes place and the red reaction mixture becomes homogeneous after 40 minutes. A solution of iodine in aqueous potassium iodide is added to the reaction mixture and the resultant tetramethylthiuram disulfide is isolated by filtration. Hydrogen peroxide may be used as the oxidizing agent in place of the iodine-potassium iodide solution.

Example V

According to the procedure of Example I, a mixture of 52.4 parts of N,N-dimethylacetamide 50 parts of carbon disulfide is added to a solution of 48 parts of sodium hydroxide in 200 parts of water. An exothermic reaction takes place to form a homogeneous red reaction mixture after 35 minutes. The reaction mixture is cooled to below 10° C. and made just neutral to phenolphthalein by adding 10% sulfuric acid. The solution is kept at about 5° C. and well stirred while a solution made up by adding 147 parts of sulfuric acid to a cooled solution of 1700 parts of 3% hydrogen peroxide in 600 parts of water is slowly added. The addition is stopped when the mixture becomes neutral to litmus and remains so for half an hour. The resultant tetramethylthiuram disulfide is isolated by filtration.

Example VI

N,N-dimethylformamide is reacted with carbon disulfide and alkali as described in Example I. To the homogeneous reaction mixture is added, with efficient stirring, a 10% solution of zinc sulfate till no further precipitate is obtained. The precipitate of zinc dimethyldithiocarbamate is separated by filtration and dried in a current of air.

Example VII

To a mixture of 158 parts of barium hydroxide octahydrate with 300 parts of water warmed to 40° C. are added 34 parts of N,N-dimethylformamide and 38 parts of carbon disulfide. The mixture is stirred under reflux for 1¼ hours. During this period it becomes yellow and the two liquid phases merge into one. During the first hour the temperature of the reaction mixture drops to 38° C. During the next 15 minutes it drops further to 36°. The reaction mixture is cooled to room temperature and filtered to remove insoluble material. The filtrate contains the barium salt of dimethyldithiocarbamic acid. Addition of a solution of iodine in water saturated with potassium iodide to a portion of the filtrate results in the precipitation of tetramethylthiuram disulfide which is isolated by filtration. Addition of a dilute zinc chloride solution to another portion of the filtrate results in the precipitation of the white zinc salt of dimethyldithiocarbamic acid, which is isolated by filtration. Addition of a dilute lead acetate solution to another portion of the filtrate results in the precipitation of the white lead salt of dimethyldithiocarbamic acid, which is isolated by filtration. Addition of a dilute silver nitrate solution to another portion of the filtrate results in the precipitation of the dark brown silver salt of dimethyldithiocarbamic acid, which is isolated by filtration. Mercuric chloride forms a white salt, manganese acetate a tan salt, stannic chloride an orange-yellow salt, and cupric acetate a black salt.

The general equation of the formation of the dialkyldithiocarbamates is as follows:

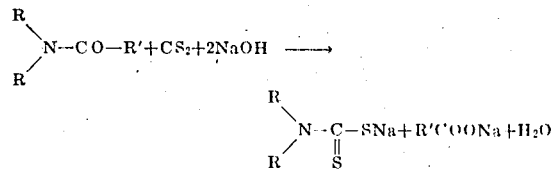

The metathesis whereby zinc or other salts are formed is represented by the following general equation:

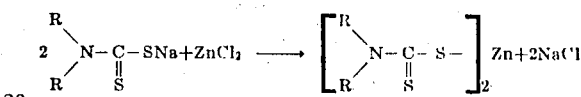

In the process of the present invention, any amide of an aliphatic carboxylic acid of up to three carbon atoms free from substituents other than hydroxy or alkoxy and having on the amide nitrogen two saturated aliphatic hydrocarbon radicals of up to three carbon atoms may be reacted, in an alkaline medium, with carbon bisulfide to form a corresponding N,N-dialkyl substituted dithiocarbamate which is one phase of the invention. A further phase of the invention is the oxidation of the N,N-dialkyl dithiocarbamates to the corresponding thiuram disulfides. Thus there may be used N,N-dimethyl-, N,N-diethyl-, N,N-dipropyl-, N,N-diisopropyl-, N-ethyl-N-methyl-, N-ethyl-N-propyl-, N-methyl-N-isopropyl-, formamides, acetamides, hydroxyacetamides, methoxy-acetamides, ethoxyacetamides, propionamides, lactamides, etc. Tertiary amides of saturated unsubstituted monocarboxylic acids, i. e., of saturated fatty acids, are preferred.

A preferred embodiment of this invention is the alkaline hydrolysis of an N,N-disubstituted formamide, the substituents being alkyl radicals of up to three carbon atoms, in the presence of carbon disulfide, followed by oxidation of the resulting dialkyldithiocarbamate to the corresponding tetraalkylthiuram disulfide. Use of formamides is preferable because they are available by a 1-step process employing starting materials other than an alkylamine. The preferred most specific embodiment is the alkaline hydrolysis of dimethylformamide in the presence of carbon disulfide, followed by oxidation of the resulting dimethyldithiocarbamate to tetramethylthiuram disulfide. The use of dimethylformamide is preferred because the reactions involved proceed more smoothly and the final product is obtained in the best yields and is most widely used.

When an N,N-dialkylamide is employed, an N,N-dialkyldithiocarbamate is obtained and this on oxidation gives the corresponding N,N,N',N'-tetraalkylthiuram disulfide. The dithiocarbamate formed may be isolated, or it may be reacted further without isolation from the reaction mixture. Thus, if a water soluble metal salt such as lead acetate or zinc sulfate is added there is formed by double decomposition the lead or zinc salt of the substituted dithiocarbamic acid. Water soluble salts of metals including iron, cobalt, nickel, silver, bismuth, zinc, lead, mercury, cadmium, copper, arsenic, manganese, molybdenum, antimony, and tin may be employed. Or if an oxidizing agent such as iodine, bromine, chlorine, sodium nitrite, a peroxide, or any other oxidizing agent disclosed in the literature as effective in such capacity, is added to the reaction mixture, a tetraalkylthiuram disulfide is obtained directly.

The rate of reaction in the first step of this process is dependent on the temperature. In some cases it is desirable to apply heat in excess of the heat of reaction in order to speed up the reaction. The temperature at atmospheric pressure is limited by the vapor pressures of reactants and diluents. In cases where use of higher temperatures is desirable, it is necessary to carry out the reaction in a closed reactor. In such cases the upper temperature limit, as far as is known, is the point of thermal decomposition of reactants and products. The temperature may be as low as 20° C. or lower, although at such temperatures the rate of reaction is usually very low and much more time is required. The pressure depends on the vapor pressures of reactants, products, and diluents at the temperature employed and is limited to that which the equipment is capable of withstanding.

The reaction in the first step of this process is preferably carried out in the presence of water or an hydroxylated organic diluent which is a solvent for the alkali and amide. Of such organic diluents alcohols are most suitable. The lower aliphatic alcohols, e. g., methanol, ethanol, propanol, isopropanol, butanol, methoxyethanol, ethylene glycol, etc. may be used. If isolation of the substituted dithiocarbamate produced in this step of the process is desired, it is usually more convenient to operate in the presence of such an organic diluent. For this purpose the alcohol should be readily volatile and for this and other reasons methanol and ethanol are preferred. However, if the dithiocarbamate is not to be isolated before oxidation, and the oxidizing agent is to be added directly to the reaction mixture, it is usually more convenient to carry out the first step in the presence of water. Any alkali metal or alkaline earth metal hydroxide appreciably soluble under the conditions of reaction may be used. For reasons of economy sodium hydroxide is ordinarily employed.

The proportions of reactants in the first step of this process are not limited to those used in the above examples. For each molecular weight of substituted amide there should be used at least one molecular weight of carbon disulfide and at least two molecular weights of alkali. If somewhat lower proportions of carbon disulfide or alkali are used, the same products are obtained but in diminished yield. It is generally better to use a slight excess over one molecular weight of carbon disulfide on account of its high volatility and consequent loss by evaporation. The order of addition of reactants is not limited to that used in the above examples. Thus the alkali solution, carbon disulfide, and amide may be added to the reactor in any desired order.

The products of the first step of this process, that is, salts of dialkyl dithiocarbamates, are useful as insecticides, rubber accelerators, and intermediates. The products of the oxidation step, tetraalkylthiuram disulfides, are in general use as insecticides and rubber accelerators.

The above description and examples are intended to be illustrative only. Any modification of or variation therefrom which conforms to the spirit of the invention is intended to be included within the scope of the claims.

What is claimed is:

1. Process which comprises bringing one molecular weight (73 parts) of dimethylformamide in contact at a temperature within the range from about 20° C. to decomposition temperature with at least one molecular weight (76 parts) of carbon disulfide and at least two molecular weights of sodium hydroxide (80 parts).

2. Process which comprises reacting one molecular weight (73 parts) of dimethylformamide with at least one molecular weight (76 parts) of carbon disulfide and at least two molecular weights of caustic alkali.

3. Process which comprises bringing dimethylformamide in contact at a temperature within the range from about 20° C. to decomposition temperature with carbon disulfide and caustic alkali solution and isolating the dimethyldithiocarbamic acid as a salt thereof insoluble in the reaction medium.

4. Process which comprises bringing dimethylformamide in contact at a temperature within the range from about 20° C. to decomposition temperature with carbon disulfide and caustic alkali solution and oxidizing the dimethyldithiocarbamic acid to tetramethylthiuram disulfide.

5. Process which comprises bringing a dialkylformamide wherein the alkyl groups contain up to three carbon atoms in contact at a temperature within the range from about 20° C. to decomposition temperature with carbon disulfide and a caustic alkali solution.

6. Process which comprises bringing a dialkylformamide wherein the alkyl groups contain up to three carbon atoms in contact at a temperature within the range from about 20° C. to decomposition temperature with carbon disulfide and an aqueous solution of an alkali of the class consisting of alkali metal and alkaline earth metal hydroxides.

7. Process which comprises bringing a dialkylformamide wherein the alkyl groups contain up to three carbon atoms in contact at a temperature within the range from about 20° C. to decomposition temperature with carbon disulfide and a caustic alkali solution, and isolating the dialkyldithiocarbamic acid as a salt thereof.

8. Process which comprises bringing a dialkylformamide wherein the alkyl groups contain up to three carbon atoms in contact at a temperature within the range from about 20° C. to decomposition temperature with carbon disulfide and a caustic alkali solution, and oxidizing the dialkyldithiocarbamic acid to a tetraalkylthiuram disulfide.

9. Process which comprises bringing an N,N-dialkylamide of a saturated fatty acid of up to three carbon atoms, the N-alkyl groups having up to three carbon atoms, in contact at a temperature within the range from about 20° C. to decomposition temperature with caustic alkali solution and carbon disulfide.

10. Process which comprises bringing an N,N-dialkylamide of a saturated fatty acid of up to three carbon atoms, the N-alkyl groups having up to three carbon atoms, in contact at a temperature within the range from about 20° C. to decomposition temperature with carbon disulfide and an aqueous solution of an alkali of the class consisting of alkali metal and alkaline earth metal hydroxides.

11. Process which comprises bringing an N,N-dialkylamide of a saturated fatty acid of up to three carbon atoms, the N-alkyl groups having up to three carbon atoms, in contact at a temperature within the range from about 20° C. to decomposition temperature with caustic alkali solution and carbon disulfide, and isolating the dialkyldithiocarbamic acid as a salt thereof.

12. Process which comprises bringing an N,N-dialkylamide of a saturated fatty acid of up to three carbon atoms, the N-alkyl groups having up to three carbon atoms, in contact at a temperature within the range from about 20° C. to decomposition temperature with caustic alkali solution and carbon disulfide, and oxidizing the dialkyldithiocarbamic acid to a tetraalkylthiuram disulfide.

13. Process which comprises bringing an N,N-dialkylamide of an aliphatic acid of the acetic acid series having up to three carbon atoms, the N-alkyl radicals being each of not more than three carbon atoms, in contact at a temperature within the range from about 20° C. to decomposition temperature with caustic soda solution and carbon disulfide.

14. Process which comprises bringing an N,N-dialkylamide of an aliphatic acid having any substituents selected from the class consisting of hydroxyl and alkoxyl and having up to three carbon atoms, the N-alkyl radicals being each of not more than three carbon atoms, in contact at a temperature within the range from about 20° C. to decomposition temperature with caustic alkali solution and carbon disulfide, and isolating the dialkyldithiocarbamic acid as a salt thereof.

15. Process which comprises bringing an N,N-dialkylamide of an aliphatic acid having any substituents selected from the class consisting of hydroxyl and alkoxyl and having up to three carbon atoms, the N-alkyl radicals being each of not more than three carbon atoms, in contact at a temperature within the range from about 20° C. to decomposition temperature with caustic alkali solution and carbon disulfide, and oxidizing the dialkyldithiocarbamic acid to a tetraalkylthiuram disulfide.

JULIAN WERNER HILL.